US012603977B2

(12) United States Patent
Endo

(10) Patent No.: US 12,603,977 B2
(45) Date of Patent: Apr. 14, 2026

(54) PROJECTION IMAGE CORRECTION METHOD USING CHANGING POSITION OF CONTROL POINT AND PROJECTION SYSTEM

(71) Applicant: SEIKO EPSON CORPORATION, Tokyo (JP)

(72) Inventor: Masaaki Endo, Beppu (JP)

(73) Assignee: SEIKO EPSON CORPORATION, Tokyo (JP)

( * ) Notice: Subject to any disclaimer, the term of this patent is extended or adjusted under 35 U.S.C. 154(b) by 423 days.

(21) Appl. No.: 18/127,080

(22) Filed: Mar. 28, 2023

(65) Prior Publication Data

US 2023/0314918 A1 Oct. 5, 2023

(30) Foreign Application Priority Data

Mar. 29, 2022 (JP) ................................ 2022-053880

(51) Int. Cl.
*H04N 9/31* (2006.01)

(52) U.S. Cl.
CPC ......... *H04N 9/3185* (2013.01); *H04N 9/3179* (2013.01); *H04N 9/3188* (2013.01); *H04N 9/3194* (2013.01)

(58) Field of Classification Search
CPC .. G03B 21/147; H04N 9/3185; H04N 9/3188; H04N 9/3182; H04N 9/3179; H04N 9/3191; H04N 9/3194
See application file for complete search history.

(56) References Cited

U.S. PATENT DOCUMENTS 6,727,885 B1* 4/2004 Ishino ................... G06F 3/0325
                                                                                348/181
7,039,253 B2* 5/2006 Matsuoka ............. G06F 3/0426
                                                                                382/312
(Continued)

FOREIGN PATENT DOCUMENTS

JP          2012-129594 A       7/2012
JP            2013078001 A  *   4/2013   ............... H04N 5/74
(Continued)

OTHER PUBLICATIONS

Panasonic Connect Co., Ltd.; "Software Applications"; pp. 1-6.
(Continued)

*Primary Examiner* — Bao-Luan Q Le
(74) *Attorney, Agent, or Firm* — Oliff PLC

(57) ABSTRACT

When a camera detects light which satisfies a first condition and with which a projection surface is irradiated by a pointing apparatus in captured images formed by capturing the projection surface, the camera selects at least one of a plurality of control points as a control point in a selected state based on the position of the light which satisfies the first condition in the captured images, whereas when the camera detects light which satisfies a second condition different from the first condition and with which the projection surface is irradiated by the pointing apparatus in the captured images, the camera transmits an instruction to change the position of the control point in the selected state to a projector based on a change in the position of the light which satisfies the second condition and is detected in the captured images.

11 Claims, 11 Drawing Sheets

(56) References Cited

U.S. PATENT DOCUMENTS

| | | | | |
|---|---|---|---|---|
| 7,119,788 | B2 * | 10/2006 | Gomi | G06F 3/0425 |
| | | | | 345/158 |
| 7,956,842 | B2 * | 6/2011 | Ting | G06F 3/04182 |
| | | | | 345/169 |
| 8,106,884 | B2 * | 1/2012 | Nam | G06F 3/0386 |
| | | | | 345/158 |
| 8,259,063 | B2 * | 9/2012 | Ting | G06F 3/0386 |
| | | | | 345/157 |
| 8,750,646 | B2 * | 6/2014 | Yoshimura | H04N 9/3185 |
| | | | | 382/293 |
| 9,285,897 | B2 * | 3/2016 | Banning | G06F 3/0346 |
| 9,594,460 | B2 * | 3/2017 | Kubo | G06F 3/0425 |
| 9,992,466 | B2 * | 6/2018 | Pawlak | H04N 9/3185 |
| 10,015,457 | B2 * | 7/2018 | Uchiyama | G06F 3/0425 |
| 2001/0010514 | A1 * | 8/2001 | Ishino | G06F 3/0325 |
| | | | | 345/158 |
| 2003/0011566 | A1 * | 1/2003 | Gomi | G06F 3/0425 |
| | | | | 345/157 |
| 2003/0021492 | A1 * | 1/2003 | Matsuoka | G06F 3/0386 |
| | | | | 382/295 |
| 2003/0210230 | A1 * | 11/2003 | Waters | G06F 3/03542 |
| | | | | 345/158 |
| 2006/0007134 | A1 * | 1/2006 | Ting | G06F 3/04182 |
| | | | | 345/156 |
| 2007/0013657 | A1 * | 1/2007 | Banning | G06F 3/0346 |
| | | | | 345/157 |
| 2007/0216644 | A1 * | 9/2007 | Nam | G06F 3/0321 |
| | | | | 345/158 |
| 2007/0290995 | A1 * | 12/2007 | Ting | G06F 3/0386 |
| | | | | 345/157 |
| 2012/0212415 | A1 * | 8/2012 | Yokobayashi | G06F 3/0425 |
| | | | | 345/158 |
| 2012/0242880 | A1 * | 9/2012 | Kubo | G06F 3/0425 |
| | | | | 348/333.1 |
| 2013/0083058 | A1 * | 4/2013 | Yoshimura | H04N 5/74 |
| | | | | 345/629 |
| 2015/0035995 | A1 * | 2/2015 | Uchiyama | H04N 9/3191 |
| | | | | 348/189 |
| 2015/0208050 | A1 * | 7/2015 | Pawlak | H04N 9/3194 |
| | | | | 348/189 |
| 2019/0124309 | A1 * | 4/2019 | Ichieda | H04N 9/3185 |
| 2021/0329205 | A1 | 10/2021 | Ida et al. | |

FOREIGN PATENT DOCUMENTS

| | | | | |
|---|---|---|---|---|
| JP | 2013080296 | A | * | 5/2013 |
| JP | 2014-74825 | A | | 4/2014 |
| JP | 2014074825 | A | * | 4/2014 |
| JP | 5768639 | B2 | * | 8/2015 |
| JP | 2020-34765 | A | | 3/2020 |

OTHER PUBLICATIONS

Epson "Business Projector Epson EB-L30000U/L30002U"; pp. 1-7.
Panasonic Corporation; "Geometry Manager Pro Manual"; May 2021; pp. 1-23.

* cited by examiner

Figure 9:
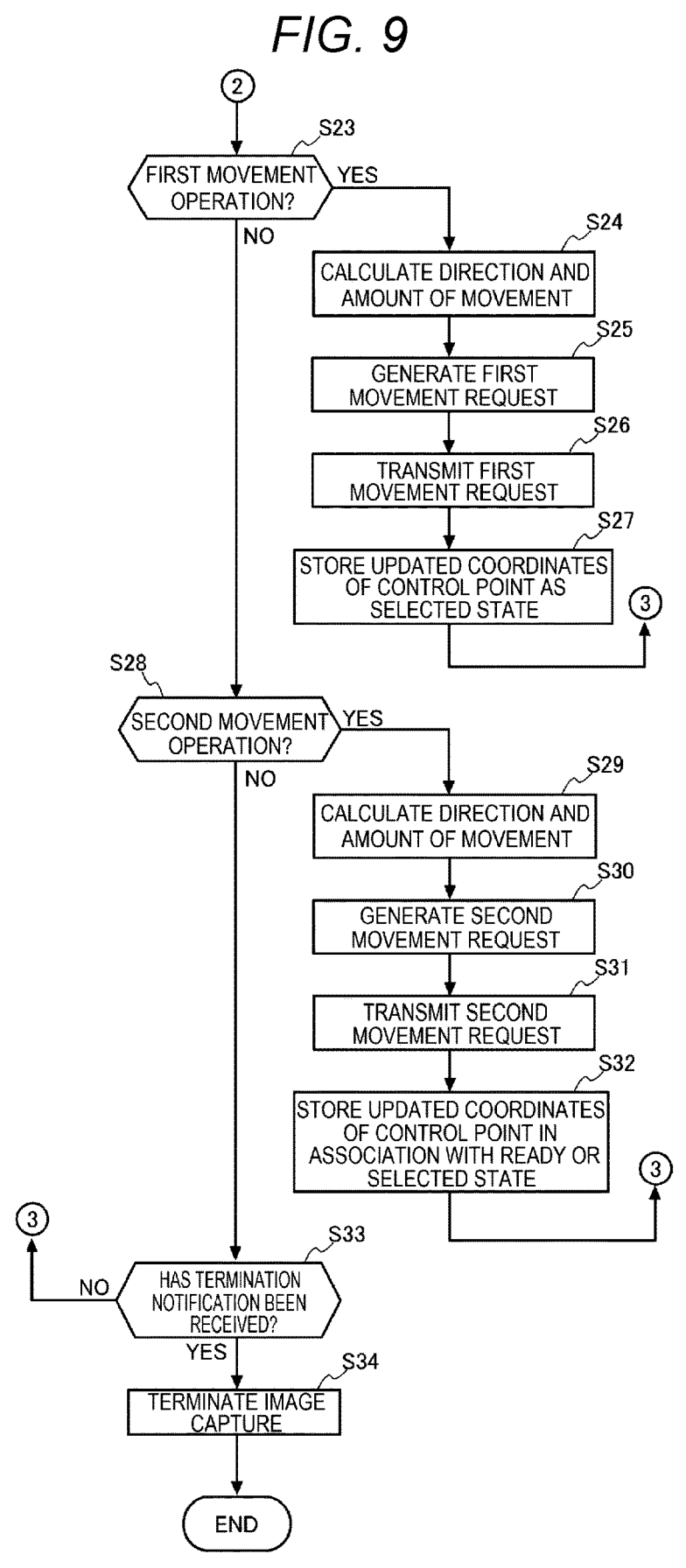

S23
FIRST MOVEMENT OPERATION? — YES

NO

S24
CALCULATE DIRECTION AND AMOUNT OF MOVEMENT

S25
GENERATE FIRST MOVEMENT REQUEST

S26
TRANSMIT FIRST MOVEMENT REQUEST

S27
STORE UPDATED COORDINATES OF CONTROL POINT AS SELECTED STATE (3)

S28
SECOND MOVEMENT OPERATION? — YES

NO

S29
CALCULATE DIRECTION AND AMOUNT OF MOVEMENT

S30
GENERATE SECOND MOVEMENT REQUEST

S31
TRANSMIT SECOND MOVEMENT REQUEST

S32
STORE UPDATED COORDINATES OF CONTROL POINT IN ASSOCIATION WITH READY OR SELECTED STATE (3)

(3)

S33
HAS TERMINATION NOTIFICATION BEEN RECEIVED?

NO

YES

S34
TERMINATE IMAGE CAPTURE

END

PROJECTION IMAGE CORRECTION METHOD USING CHANGING POSITION OF CONTROL POINT AND PROJECTION SYSTEM

The present application is based on, and claims priority from JP Application Serial Number 2022-053880, filed Mar. 29, 2022, the disclosure of which is hereby incorporated by reference herein in its entirety.

BACKGROUND

1. Technical Field

The present disclosure relates to a projection image correction method and a projection system.

2. Related Art

There has been a known method for correcting the shape of a projection image by using a pointing apparatus.

For example, JP-A-2012-129594 discloses a projector that allows a user to use a laser pointer to correct the positions of the four corners of a projection image.

When a wrong position is selected as the position to be corrected due, for example, to the user's shaken hand, however, correction intended by the user is not performed in some cases.

SUMMARY

The present disclosure relates to a projection image correction method including capturing images of a projection surface on which a pattern image containing a plurality of control points is projected, selecting at least one of the plurality of control points as a first control point based on a position of light which satisfies a first condition and with which the projection surface is irradiated via a pointing element in a group of captured images including a plurality of captured images produced through capture of images of the projection surface when the light which satisfies the first condition is detected in the group of captured images, changing a position of the first control point based on a change in a position of light which satisfies a second condition different from the first condition and with which the projection surface is irradiated via the pointing element in the group of captured images when the light which satisfies the second condition is detected in the group of captured images, and displaying the pattern image in which the position of the first control point is changed on the projection surface.

The present disclosure further relates to a projection system including a projector that displays a pattern image containing a plurality of control points on a projection surface, an imaging apparatus that captures images of the projection surface, a pointing element that irradiates the projection surface with light that satisfies a condition corresponding to a user's operation, and one or more processors, and the one or more processors each selects at least one of the plurality of control points as a first control point based on a position of light which satisfies a first condition and with which the projection surface is irradiated via a pointing element in a group of captured images including a plurality of captured images produced by the imaging apparatus through capture of images of the projection surface when the light which satisfies the first condition is detected in the group of captured images, changes a position of the first control point based on a change in a position of light which satisfies a second condition different from the first condition and with which the projection surface is irradiated via the pointing element in the group of captured images when the light which satisfies the second condition is detected in the group of captured images, and displays the pattern image in which the position of the first control point is changed on the projection surface.

BRIEF DESCRIPTION OF THE DRAWINGS

FIG. 9 is another flowchart showing the action of the camera.

DESCRIPTION OF EXEMPLARY EMBODIMENTS

1. Configuration of Projection System 1

Figure 1:
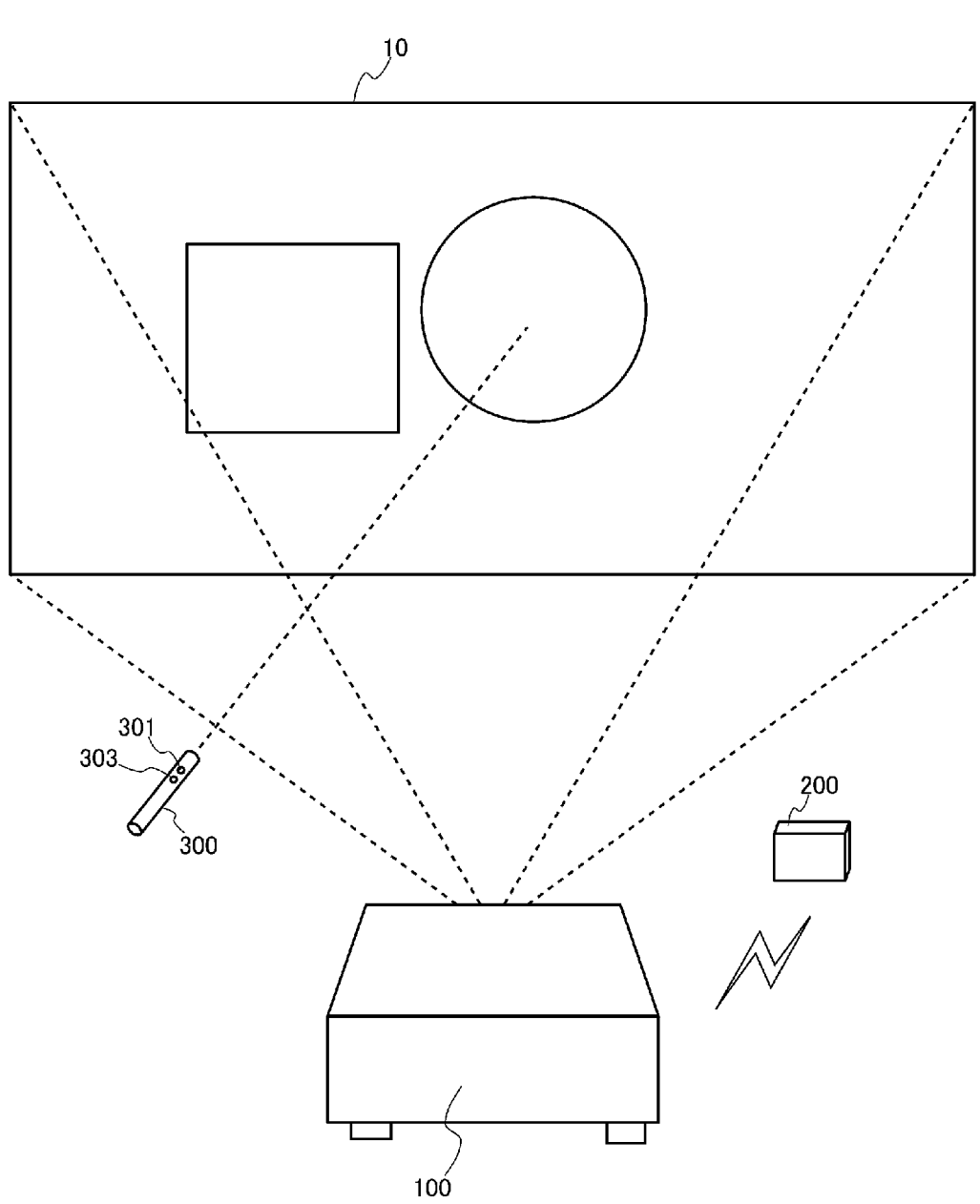
FIG. 1 shows the system configuration of a projection system.

FIG. 1 shows the system configuration of a projection system 1.

The projection system 1 includes a projector 100, a camera 200, and a pointing apparatus 300. The camera 200 corresponds to an imaging apparatus, and the pointing apparatus 300 corresponds to a pointing element.

The projector 100 generates image light based on image data supplied from an image supplier, such as a personal computer. The projector 100 enlarges the generated image light and projects the enlarged image light onto a projection surface 10. A projection image that is an image based on the image data is thus displayed on the projection surface 10.

The camera 200 captures an image of a range containing the projection surface 10 to generate a captured image. The camera 200 performs image analysis on the generated captured image to detect a point position P, which is the position where the projection surface 10 is irradiated with laser light, and control points S contained in a second pattern image 30 displayed by the projector 100. The second pattern image 30 and the control points S will be described later.

The pointing apparatus 300 is an apparatus that outputs the laser light. A user holds the pointing apparatus 300 with a hand and points to the point position P on the projection image displayed on the projection surface 10 by irradiating the projected image with the laser light.

2. Configuration of Projector 100

Figure 2:
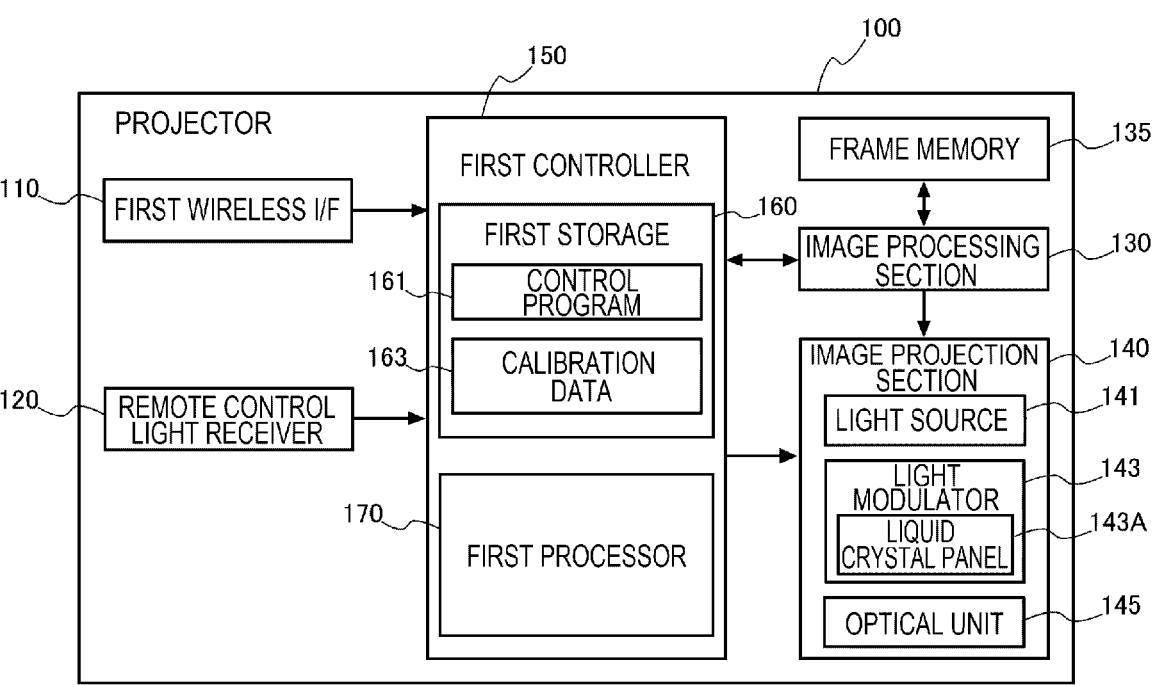
FIG. 2 is a block diagram showing the configuration of a projector.

FIG. 2 is a block diagram showing the configuration of the projector 100.

The configuration of the projector 100 will be described with reference to FIG. 2.

The projector 100 includes a first wireless interface 110, a remote control light receiver 120, an image processing section 130, a frame memory 135, an image projection section 140, and a first controller 150. An interface is hereinafter abbreviated to an I/F.

The first t wireless I/F 110 is a wireless communication device including an interface circuit compatible with standards, for example, Bluetooth and Wi-Fi. Bluetooth and Wi-Fi are registered trademarks. The first wireless I/F 110 is connected wirelessly to the camera 200 and communicates data mutually to and from the camera 200. In place of the first wireless I/F 110, the projector 100 may include a wired I/F including an interface circuit compatible with standards, for example, USB (universal serial bus).

The remote control light receiver 120 receives an infrared signal transmitted from a remote control 5 and outputs an operation signal corresponding to the content of the operation indicated by the received infrared signal to the first controller 150.

The remote control 5 includes operators that allows the user to perform operation on a user interface. When an operator is operated by the user, the remote control 5 transmits an infrared signal corresponding to the operated operator.

The frame memory 135 is coupled to the image processing section 130. The image processing section 130 loads image data inputted from the first controller 150 or via the first communication I/F 110 in the frame memory 135. The frame memory 135 is formed, for example, of an SDRAM (synchronous dynamic random access memory).

The image processing section 130 performs image processing on the image data loaded in the frame memory 135. Example of the image processing may include resolution conversion or resizing, distortion correction, shape correction, digital zooming, and adjustment of the color tone and brightness of an image. The image processing section 130 performs image processing specified by the first controller 150 and uses, as required, parameters inputted from the first controller 150 to perform the image processing. The image processing section 130 can, of course, perform a plurality of types of the image processing described above in combination. The image processing section 130 reads the image data having undergone the processing from the frame memory 135 and outputs the read image data to the image projection section 140.

The image processing section 130 and the frame memory 135 are each formed, for example, of an integrated circuit. The integrated circuit includes an LSI (large scale integrated circuit), an ASIC (application specific integrated circuit), a PLD (programmable logic device), an FPGA (field-programmable gate array), an SoC (system-on-a-chip), and other devices. An analog circuit may form a portion of the configuration of an integrated circuit, or the first controller 150 and an integrated circuit may be combined with each other.

The image projection section 140 includes a light source 141, a light modulator 143, and an optical unit 145.

The light source 141 includes a discharge-type light source lamp, such as an ultrahigh-pressure mercury lamp and a metal halide lamp, or a solid-state light source, such as a light emitting diode and a semiconductor laser. The light emitted from the light source 141 enters the light modulator 143.

The light modulator 143 includes a transmissive liquid crystal panel 143A, which is formed of a liquid crystal material encapsulated between a pair of transparent substrates, as a light modulation device that modulates the light emitted from the light source 141. The liquid crystal panel 143A has a panel region formed of a plurality of pixels arranged in a matrix. The light modulator 143 applies a drive voltage corresponding to the inputted image data to each of the pixels in the panel region to change the light transmittance of the pixel to the transmittance corresponding to the image data. When the light emitted from the light source 141 passes through the liquid crystal panel 143A, the light is modulated to generate image light corresponding to the image data.

The light modulation device provided in the light modulator 143 is not limited to a transmissive liquid crystal panel and may instead be a reflective liquid crystal panel or a digital micromirror device (DMD).

The optical unit 145 includes a projection lens and other components that are not shown, enlarges the image light as a result of the modulation performed by the light modulator 143, and projects the enlarged image light onto the projection surface 10. A projection image that is an image corresponding to the image light is thus displayed on the projection surface 10.

The first controller 150 is a computer apparatus including a first storage 160 and a first processor 170.

The first storage 160 includes a nonvolatile memory such as a ROM (read only memory), and a volatile memory such as a RAM (random access memory). The ROM stores a control program 161, calibration data 163, and a variety of types of setting information used to control the action of the projector 100. The RAM is used to temporarily store a variety of data and other pieces of information.

The calibration data 163 is data that associates coordinates set at the liquid crystal panel 143A with coordinates set at the captured image generated by the camera 200. That is, the calibration data 163 can be used to convert the coordinates set at the captured image into the coordinates set at the liquid crystal panel 143A. Hereinafter, a coordinate system set at the liquid crystal panel 143A is referred to as a panel coordinate system, and a coordinate system set at the captured image is referred to as a camera coordinate system.

The first processor 170 is an arithmetic operation apparatus including one or more CPUs (central processing units), MPUs (micro-processing units), or other components. The first processor 170 executes the control program 161 to control the action of each portion of the projector 100.

3. Configuration of Camera

Figure 3:
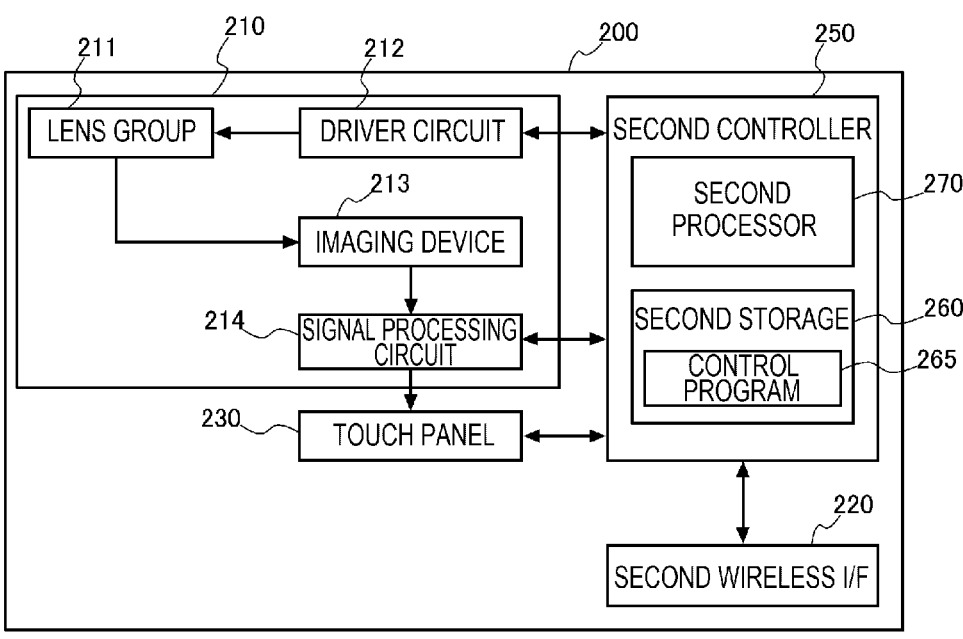
FIG. 3 is a block diagram showing the configuration of a camera.

FIG. 3 is a block diagram showing the configuration of the camera 200.

The camera 200 includes an imager 210, a second wireless I/F 220, a touch panel 230, and a second controller 250.

The imager 210 includes a lens group 211, a driver circuit 212, an imaging device 213, and a signal processing circuit 214.

The lens group 211 includes a variety of lenses, such as an imaging lens and a focusing lens, and a diaphragm.

The driver circuit 212 controls the lens group 211 in accordance with an instruction from the second controller 250. Specifically, the driver circuit 212 controls the positions of the imaging lens, the focus lens, and the diaphragm, and controls the opening of the diaphragm.

The imaging device 213 includes an image sensor such as a CMOS (complementary metal Oxide semiconductor) sensor and a CCD (charge coupled device) sensor. The imaging device 213 has a configuration in which a plurality of pixels are two-dimensionally arranged. Subject light incident on the imaging device 213 is photoelectrically converted on a pixel basis into image signals corresponding to the three primary colors, red, green, and blue. The converted image signals are outputted to the signal processing circuit 214.

The signal processing circuit 214 performs signal processing, such as gain adjustment, A/D conversion, noise removal, color correction, and gamma correction, on the inputted image signals. The signal processing circuit 214 outputs a captured image generated by the signal processing of the image signals to the second controller 250 and the touch panel 230.

The second wireless I/F 220 is a wireless communication device including an interface circuit compatible with standards, for example, Bluetooth and Wi-Fi. The second wireless I/F 220 is connected wirelessly to the projector 100 and communicates data mutually to and from the camera 200. In place of the second wireless I/F 220, the camera 200 may include a wired I/F including an interface circuit compatible with standards, for example, USB.

The touch panel 230 includes a display panel, such as a liquid crystal panel and an organic electro-luminescence (EL) panel, and a touch sensor. The touch sensor detects touch operation and outputs an operation signal containing an operation position where the touch operation has been detected to the second controller 250. The touch sensor functions as an operation section that accepts the user's operation.

The second controller 250 is a computer apparatus including a second storage 260 and a second processor 270.

The second storage 260 includes a nonvolatile memory such as a ROM, and a volatile memory such as a RAM. The ROM stores a control program 265 and a variety of types of setting information used to control the action of the camera 200. The RAM is used to temporarily store a variety of data and other pieces of information.

The second processor 270 is an arithmetic operation apparatus including one or more CPUs or MPUs. The second processor 270 executes the control program 265 to control the action of each portion of the camera 200. The second processor 270 corresponds to one or more processors.

4. Configuration of Pointing Apparatus

Figure 4:
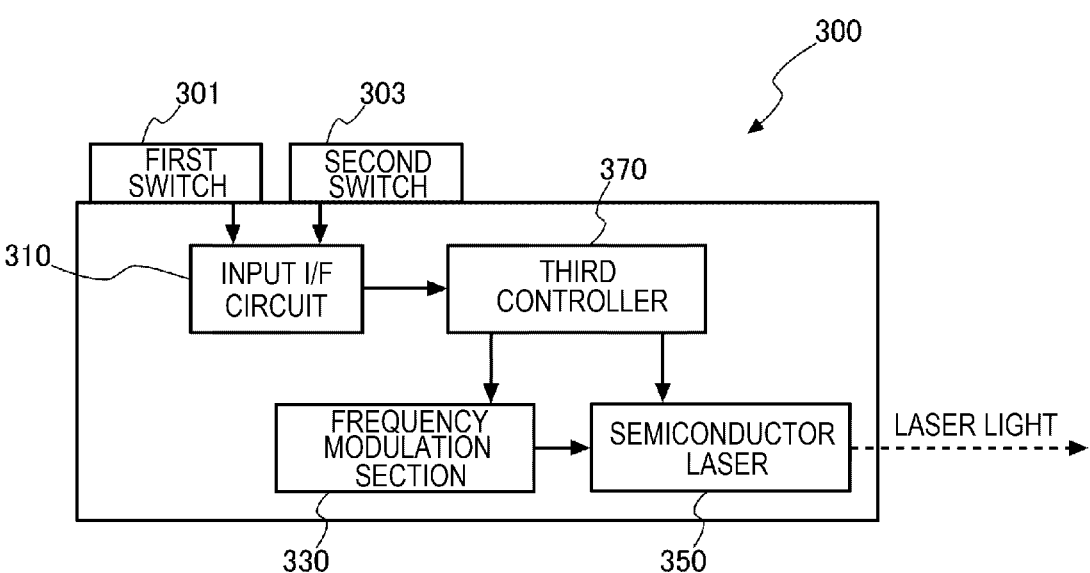
FIG. 4 is a block diagram showing the configuration of a pointing apparatuses.

FIG. 4 is a block diagram showing the configuration of the pointing apparatuses 300.

The pointing apparatus 300 includes a first switch 301, a second switch 303, an input I/F circuit 310, a semiconductor laser 350, a frequency modulation section 330, and a third controller 370.

The first switch 301 and the second switch 303 are each an operating section formed of a hardware switch that accepts the user's operation. The first switch 301 is a power switch of the pointing apparatus 300. The second switch 303 is a switch that changes the laser light outputted by the pointing apparatus 300 to modulated light that repeats light emission and no light emission at a fixed frequency for the period for which the user keeps pressing the second switch 303. The pointing apparatus 300 outputs continuous laser light when the second switch 303 is not pressed, and outputs the fixed-frequency modulated light when the second switch 303 is pressed.

When the first switch 301 or the second switch 303 is pressed, the input I/F circuit 310 outputs an operation signal corresponding to the pressed first switch 301 or second switch 303 to the third controller 370.

The semiconductor laser 350 is a light source, and performs laser oscillation to output the laser light when a current supplied from a battery that is not shown is supplied to the semiconductor laser 350.

The frequency modulation section 330 is a control circuit that controls the semiconductor laser 350 to modulate the laser light emitted from the semiconductor laser 350 into light modulated at the fixed frequency. In more detail, the frequency modulation section 330 controls the output intensity of the semiconductor laser 350 by controlling the value of the current applied to the semiconductor laser 350. For example, to perform PWM (pulse width modulation) control on the semiconductor laser 350, the value of the current to be applied may be controlled by switching the duty ratio in the PWM control. The laser light outputted by the semiconductor laser 350 controlled by the frequency modulation section 330 exits out of the pointing apparatus 300.

The third controller 370 is a computer including a memory and a processor.

When the first switch 301 is pressed and an operation signal corresponding to the operation of the first switch 301 is inputted, the third controller 370 supplies the semiconductor laser 350 with electric power to cause the semiconductor laser 350 to start outputting the laser light. The pointing apparatus 300 outputs the continuous laser light.

On the other hand, when the second switch 303 is pressed, the third controller 370 controls the frequency modulation section 330 to modulate the laser light emitted from the semiconductor laser 350 into the light modulated at the fixed frequency while an operation signal corresponding to the operation of the second switch 303 is inputted to the third controller 370. The pointing apparatus 300 outputs the modulated light modulated at the fixed frequency while the user keeps turning on the second switch 303.

5. Description of Operation of Projector and Camera

The first controller 150 of the projector 100 starts generating the calibration data 163 when an operation signal that instructs point correction is inputted from the remote control light receiver 120. The first controller 150 controls the image processing section 130 and the image projection section 140 to display a first pattern image that is not shown on the projection surface 10. The point correction is a method for correcting partial distortion of an image displayed on the projection surface 10. The first pattern image is a rectangular image and contains a plurality of marks. The plurality of marks are placed at a plurality of positions set in advance in the first pattern image. The first pattern image can, for example, be a checker pattern image containing a plurality of grid points. The first pattern image may instead be a structured light pattern image, such as a gray code pattern image or a phase shift pattern image.

Having displayed the first pattern image on the projection surface 10, the first controller 150 instructs the camera 200 to capture an image of the projection surface 10. The camera 200 captures an image of the projection surface 10 on which the first pattern image is displayed to generate a captured image, and transmits the generated captured image to the projector 100.

When the first controller 150 receives the captured image from the camera 200, the first controller 150 detects each of the plurality of marks contained in the received captured image.

The first controller 150 generates the calibration data 163 by associating the positions of the marks in the first pattern image, which is drawn at the liquid crystal panel 143A to be displayed on the projection surface 10, with the positions of the marks in the captured image. The first controller 150 causes the first storage 160 to store the generated calibration data 163.

The first controller 150 then controls the image processing section 130 and the image projection section 140 to display the second pattern image 30 on the projection surface 10.

Figure 5:
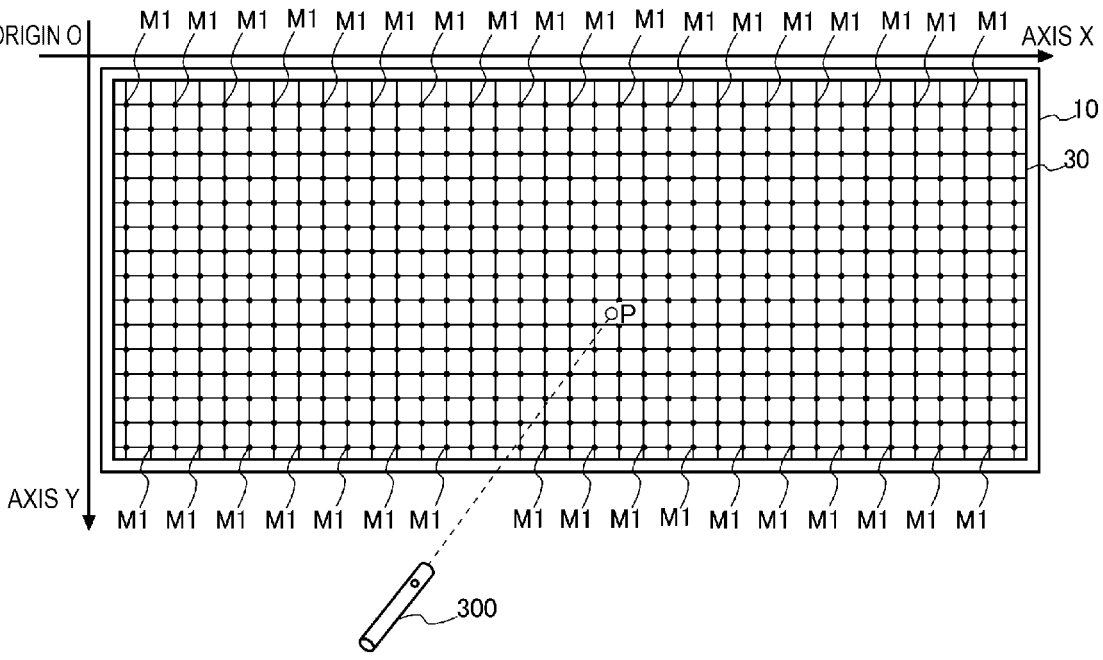
FIG. 5 shows an example of a second pattern image displayed on a projection surface.

FIG. 5 shows an example of the second pattern image 30 displayed on the projection surface 10.

The second pattern image 30 is a rectangular image in which a plurality of control points S are arranged in a matrix. The second pattern image 30 shows, in a drawing view, a plurality of line segments parallel to the vertical edges of the second pattern image 30 at equal intervals and a plurality of line segments parallel to the horizontal edges of the second pattern image 30 at equal intervals. The vertical edges in the drawing view are the edges parallel to the axis Y shown in FIG. 5, and the horizontal edges are the edges parallel to the axis X shown in FIG. 5. The right direction in the drawing view is the direction extending from an origin O along the axis X. In the drawing view, the origin O is set at the upper left corner. The control points S are set at the intersections of the line segments parallel to the vertical edges of the second pattern image 30 and the line segments parallel to the horizontal edges of the second pattern image 30. The control points S are adjustment points that allow the point correction to adjust the position where the projection image is displayed. The second pattern image 30 shown in FIG. 5 shows an example in which first marks M1 are displayed at the positions of the control points S. The first marks M1 are small black circles indicating the control points S.

The control points S can be each so set by selection operation performed via the pointing apparatus 300 that the control point S has any of three states: an initial state; a ready state; and a selected state. A control point S in the ready state corresponds to a second control point. A control point S in the selected state corresponds to a first control point.

A control point S in the initial state is an unselected control point S, which has not been selected via the pointing apparatus 300.

A control point S in the ready state is a control point selected once via the pointing apparatus 300, and the ready state can also be referred to as the state ready to be the selected state. When a control point S in the ready state is selected again via the pointing apparatus 300, that is, selected twice, the selected control point S transitions to a control point S in the selected state. Providing the ready state before transition to the selected state, erroneous operation via the pointing apparatus 300 can be reduced as compared with a case where the control points S are each so set that the control point S have one of the two states, the initial state and the selected state.

A control point S in the selected state is a control point the position of which in the second pattern image 30 can be changed by operation of the pointing apparatus 300. A control point S in the initial state and a control point S in the ready state are each a control point the position of which in the second pattern image 30 cannot be changed by operation of the pointing apparatus 300.

The state of a control point S is allowed to return to the ready or initial state by release operation performed via the pointing apparatus 300.

The state of a control point S in the selected state is changed to the ready state by performing the release operation via the pointing apparatus 300 to select the control point S. Similarly, the state of a control point S in the ready state is changed to the initial state by performing the release operation via the pointing apparatus 300 to select the control point S.

Having displayed the second pattern image 30 on the projection surface 10, the first controller 150 instructs the camera 200 to start performing processing.

Having received the processing start instruction from the projector 100, the second controller 250 of the camera 200 causes the imager 210 to start capturing images. The imager 210 captures images at intervals set in advance to generate captured images. The second controller 250 causes the second storage 260 to temporarily store the captured images generated by the imager 210.

The second controller 250 extracts the captured images from the second storage 260 and performs image analysis on the extracted captured images to detect operation performed by the user via the pointing apparatus 300. The operation performed via the pointing apparatus 300 includes first selection operation, second selection operation, the release operation, first movement operation, and second movement operation.

The second controller 250 sequentially extracts the captured images and detects the point position P contained in a plurality of the captured images. Based on the amount of displacement of the detected point position P in each of the captured images, the second controller 250 detects whether any of the following operations has been performed: the first selection operation; the second selection operation; the release operation; the first movement operation; and the second movement operation. The plurality of captured images correspond to a group of captured images.

The first selection operation and the second selection operation are each the operation of selecting a control point S. The first selection operation is the operation of changing a control point S in the initial state to a control point S in the ready state, and the second selection operation is the operation of changing a control point S in the ready state to a control point S in the selected state.

Figure 6:
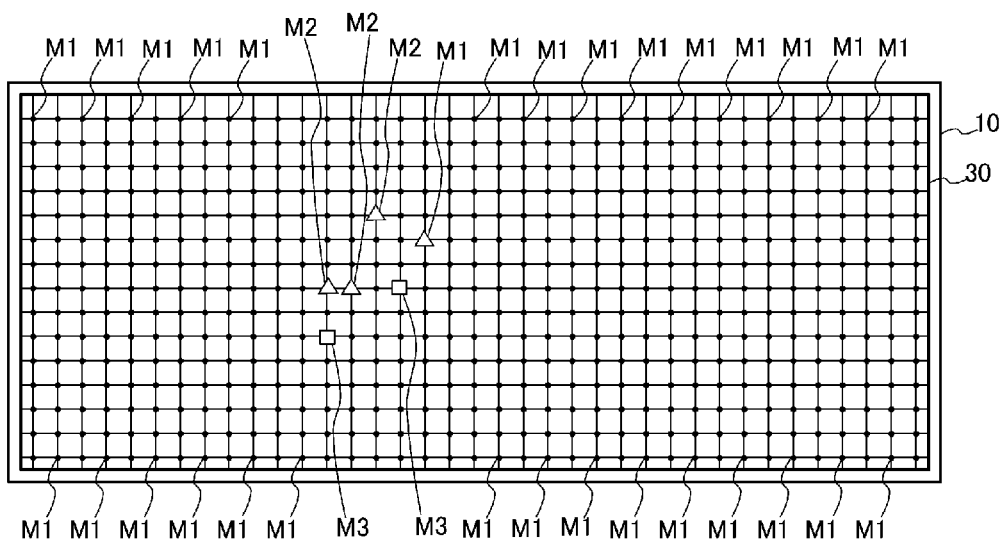
FIG. 6 shows another example of the second pattern image displayed on the projection surface.

FIG. 6 shows the second pattern image 30 displayed on the projection surface 10.

A second mark M2 is displayed at a control point S in the ready state, and a third mark M3 is displayed at a control point S in the selected state. That is, a control point S in the ready state and a control point S in the selected state are displayed in different display aspects. In the present embodiment, the second mark M2 is displayed in the form of a triangle, and the third mark M3 is displayed in the form of a rectangle, but the second mark M2 and the third mark M3 may each have any shape. The first mark M1, the second mark M2, and the third mark M3 only need to have shapes that can distinguish the control points S in the initial, ready and selected states from one another.

The first selection operation is the operation of irradiating the point position P with the laser light within a first set range set in advance around the position of a control point S in the initial state, and keeping the formed point position P within the first set range for a set period T1 set in advance. The first set range is set so as not to overlap with the first set range around each of the other adjacent control points S. The first set range can, for example, be a circular range around the control point S. The first set range may be changed in accordance with the resolution of the second pattern image 30. The first set range is an example of a third range.

When the second controller 250 detects that the point position P has been kept within the first set range around a control point S for the set period T1, and determines that the state of the control point S within the first set range is the initial state, the second controller 250 determines that the first selection operation has been detected. The set period T1 can be fixed, for example, at 0.2 seconds or can be changed.

The set period T1 corresponds to a second period. The point position P detected to fall within the first set range around the control point S for the set period T1 corresponds to light that satisfies a third condition.

The second controller 250 refers to the second storage 260 to evaluate whether the state of the control point S within the first set range is the initial state. The second controller 250 determines that the state of the control point S within the first set range is the initial state when the ready state or the selected state has not been stored as information on the coordinates corresponding to the control point S within the first set range.

Having detected the first selection operation, the second controller 250 transmits to the projector 100 a first change request containing the coordinates of the control point S and a request to change the state of the control point S from the initial state to the ready state. The coordinates of the control point S are coordinates in the camera coordinate system. The second controller 250 causes the second storage 260 to store the coordinates of the control point S in the state changed by the first change request with the coordinates associated with the ready state, which is information representing the state of the control point S.

The second selection operation is the operation of irradiating the point position P with the laser light within a second set range set in advance around the position of a control point S in the ready state, and keeping the formed point position P within the second set range for a set period T2 set in advance. The second set range is also set so as not to overlap with the second set range around each of the other adjacent control points S. The second set range can, for example, be a circular range around the control point S. The second set range may be equal to the first set range, or the first and second set ranges may differ from each other. The second set range is an example of a first range.

When the second controller 250 detects that the point position P has been kept within the second set range around a control point S for the set period T2, and determines that the state of the control point S within the second set range is the ready state, the second controller 250 determines that the second selection operation has been detected. The set period T2 is set to be longer than the set period T1. The set period T2 can be fixed, for example, at 0.5 seconds or can be changed. The set period T2 corresponds to a first period. The point position P so detected that it stays within the second set range around the control point S for the set period T2 corresponds to light that satisfies a first condition.

The second controller 250 refers to the second storage 260 to evaluate whether the state of the control point S within the second set range is the ready state. The second controller 250 determines that the state of the control point S within the second set range is the ready state when the ready state has been stored as information representing the state of the control point S associated with the coordinates thereof.

The second controller 250 transmits to the projector 100 a second change request containing the coordinates of the control point S where the second selection operation has been detected and a request to change the state of the control point S from the ready state to the selected state. The coordinates of the control point S are coordinates in the camera coordinate system. The second controller 250 causes the second storage 260 to store the coordinates of the control point S in the state changed by the second change request with the coordinates associated with the selected state, which is information representing the state of the control point S.

The release operation is the operation of irradiating the point position P with the laser light within a third set range set in advance around the position of a control point S in the ready or selected state, and keeping the formed point position P within the third set range for a period set in advance and longer than or equal to the set period T1 but shorter than the set period T2. The third set range is also set so as not to overlap with the third set range around each of the other adjacent control points S. The third set range can, for example, be a circular range around the control point S. The third set range may be equal to the first or second set range, or the first, second, and third set ranges may differ from one another.

The release operation includes first release operation and second release operation.

When the second controller 250 detects that the point position has stayed within the third set range of a control point S for the period longer than or equal to the set period T1 but shorter than the set period T2, and determines that the state of the control point S within the third set range is the ready state, the second controller 250 determines that the first release operation has been detected.

When the state of the control point S is the ready state, the second controller 250 transmits to the projector 100 a third change request containing the coordinates of the control point S where the first release operation has been detected and a request to change the state of the control point S from the ready state to the initial state. The coordinates of the control point S are coordinates in the camera coordinate system.

The second controller 250 deletes from the second storage 260 the coordinates of the control point S in the state changed by the third change request and the information representing the state stored in association with the coordinates.

When the second controller 250 detects that the point position has stayed within the third set range of a control point S for the period longer than or equal to the set period T1 but shorter than the set period T2, and determines that the state of the control point S within the third set range is the selected state, the second controller 250 determines that the second release operation has been detected.

When the state of the control point S is the selected state, the second controller 250 transmits to the projector 100 a fourth change request containing the coordinates of the control point S where the second release operation has been detected and a request to change the state of the control point S from the selected state to the ready state. The coordinates of the control point S are coordinates in the camera coordinate system. The second controller 250 changes the information representing the state stored in the second storage 260 in association with the coordinates of the control point S in the state changed by the fourth change request from the selected state to the ready state.

The first movement operation and the second movement operation are each the operation of moving the position of a control point S.

The first movement operation is the operation of moving the positions where all control points S set in the selected state are displayed via operation of the pointing apparatus 300. The second movement operation is the operation of moving all control points S in the initial, ready, and selected states contained in the second pattern image 30 via operation of the pointing apparatus 300.

Figure 7:
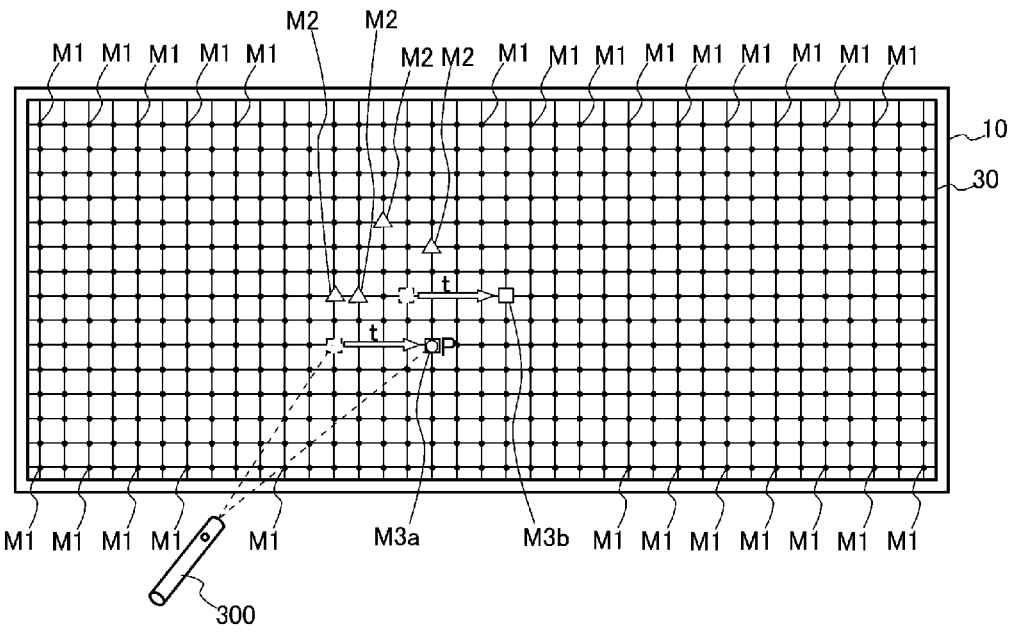
FIG. 7 shows another example of the second pattern image displayed on the projection surface.

FIG. 7 shows the second pattern image 30 displayed on the projection surface 10.

The first movement operation is the operation of moving the point position P to a position to which the control point S is desired to be moved after irradiating the point position P with the laser light within a fourth set range set in advance around the position of a control point S in any of the three states described above, and keeping the formed point position P within the fourth set range for the set period T2 set in advance. The first movement operation thereafter. The fourth set range may be equal to any of the first, second, and third set ranges, or the first, second, third, and fourth set ranges may differ from one another. The fourth set range is an example of a second range.

When the second controller 250 detects that the point position P has stayed within the fourth set range around the control point S for the set period T2, determines that the state of the control point S within the fourth set range is the selected state, and then detects that the point position P has been moved, the second controller 250 determines that the first movement operation has been detected.

The point position P so detected that it has stayed within the fourth set range around the control point S for the set period T2 and then so detected that it has been moved corresponds to light that satisfies a second condition.

The second controller 250 refers to the second storage 260 to evaluate whether the state of the control point S within the fourth set range is the selected state. The second controller 250 determines that the state of the control point S within the fourth set range is the selected state when the selected state is stored as information representing the state associated with the coordinates of the control point S within the fourth set range.

Having detected the first movement operation, the second controller 250 calculates the coordinates of the point position P before and after the movement through image analysis performed on the captured images. The second controller 250 calculates the direction in which and the amount by which the point position P has been moved based on the coordinates of the point position P before and after the movement.

The second controller 250 then refers to the second storage 260 to acquire the coordinates of all control points S set in the selected state. The second controller 250 transmits to the projector 100 a first movement request containing the coordinates of all the control points S set in the selected state and the direction and the amount of the movement. The coordinates of the control points S are coordinates in the camera coordinate system.

It is assumed that the control point S labeled with a third mark M3a shown in FIG. 7 and the control point S labeled with a third mark M3b shown in FIG. 7 are set as the control points S in the selected state. It is further assumed that the point position P is detected within the fourth set range around the third mark M3a, and that the detected point position P moves rightward by t in the drawing view.

The second controller 250 transmits to the projector 100 the first movement request to move not only the control point S labeled with the third mark M3a and accompanied by the point position P present within the fourth set range, but also the control point S labeled with the third mark M3b and set in the selected state rightward by t.

The second controller 250 then calculates the coordinates of all the control points S in the selected state after the movement based on the calculated direction and amount of the movement. The second controller 250 causes the second storage 260 to store the coordinates of each of the control points S after the movement with the coordinates associated with the selected state representing the state of the control point S at the coordinates. The coordinates of the control points S are coordinates in the camera coordinate system.

The second movement operation is performed by changing the laser light emitted from the pointing apparatus 300 to the light modulated at the fixed frequency. The pointing apparatus 300 changes the output laser light from the continuous light to the light modulated at the fixed frequency when the second switch 303 is pressed.

When the second controller 250 detects the light modulated at the fixed frequency based on the captured images, the second controller 250 starts detecting the second movement operation. After starting the detection of the second movement operation, the second controller 250 tracks the detected point position P to detect the coordinates of the point position P after the movement. The second controller 250 calculates the direction in which and the amount by which the point position P has been moved based on the coordinates of the point position P before and after the movement.

The pointing apparatus 300 may be so set that the second movement operation is performed with the control points S in the second pattern image 30 including no control point S set in the selected state.

In this case, when the second controller 250 detects that the point position P irradiated with the laser light by the pointing apparatus 300 has not moved for the set period T2, and determines that there is no control point S set in the selected state, the second controller 250 starts detecting the second movement operation. After starting the detection of the second movement operation, the second controller 250 tracks the detected point position P to detect the coordinates of the point position P after the movement. The second controller 250 calculates the direction in which and the amount by which the point position P has been moved based on the coordinates of the point position P before and after the movement.

The second controller 250 generates a second movement request containing the calculated direction and amount of the movement, and a request to move all control points S in the initial, ready, and selected states contained in the second pattern image 30, and transmits the generated second movement request to the projector 100.

The second controller 250 further calculates the coordinates of all control points S in the initial, ready, and selected states after the movement based on the calculated direction and amount of the movement. The second controller 250 causes the second storage 260 to store the coordinates of each of the control points S after the movement with the coordinates associated with the initial, ready, or selected state representing the state of the control point S at the coordinates. The coordinates of the control points S are coordinates in the camera coordinate system.

Figure 8:
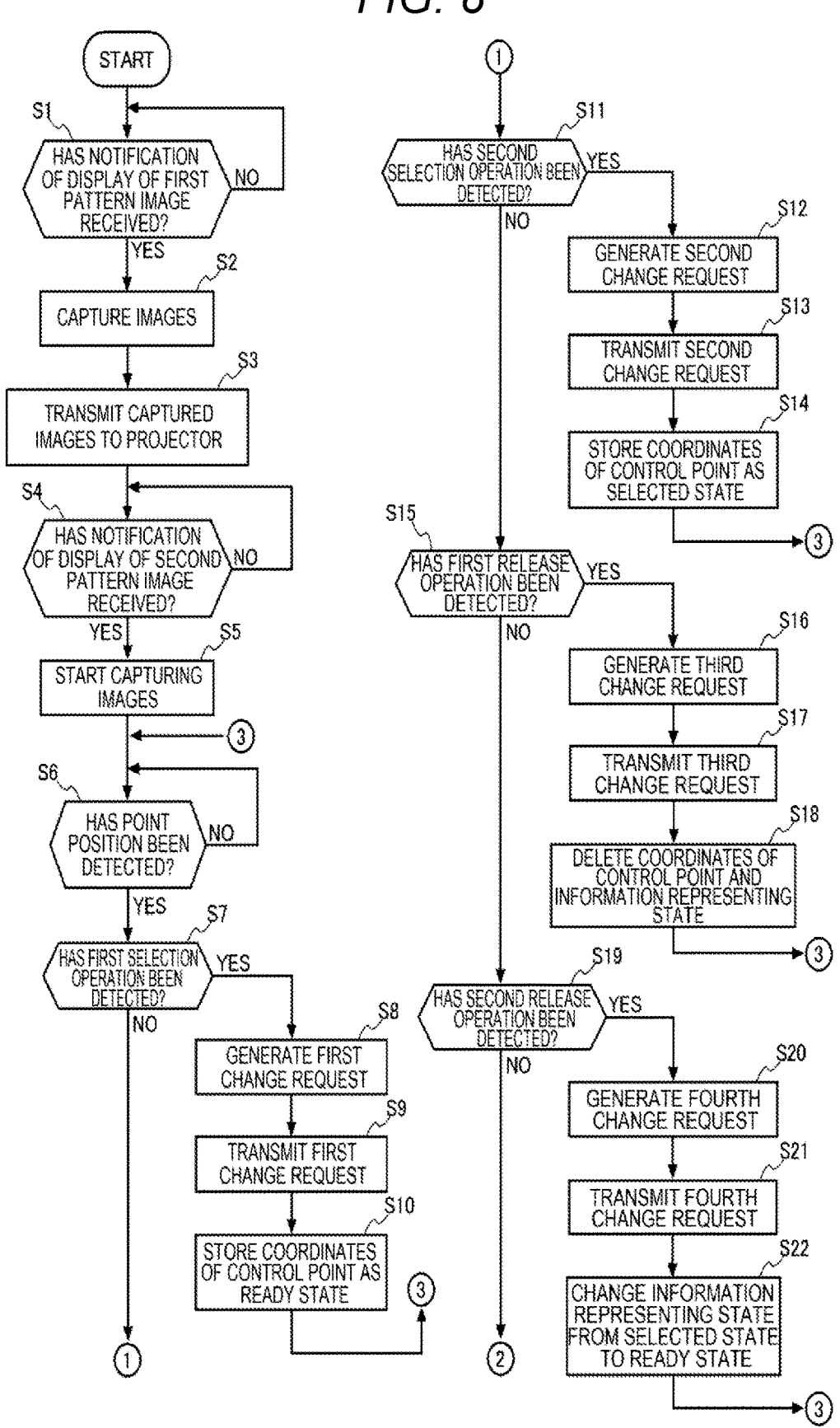
FIG. 8 is a flowchart showing the action of the camera.

FIGS. 8 and 9 are flowcharts showing the action of the camera 200. The action of the camera 200 will be described with reference to the flowcharts shown in FIGS. 8 and 9.

The second controller 250 first evaluates whether the second controller 250 has received notification of the display of the first pattern image from the projector 100 (step S1). When the second controller 250 has not received the notification of the display of the first pattern image (NO in step S1), the second controller 250 waits for reception of the display notification.

When the second controller 250 receives the notification of the display of the first pattern image (YES in step S1), the second controller 250 generates captured images through capture of images of the projection surface 10 (step S2) and transmits the generated captured images to the projector 100 (step S3).

The second controller 250 then evaluates whether the second controller 250 has received notification of the display of the second pattern image 30 from the projector 100 (step S4). When the second controller 250 has not received the notification of the display of the second pattern image 30 (NO in step S4), the second controller 250 waits for reception of the display notification.

When the second controller 250 receives the notification of the display of the second pattern image 30 (YES in step S4), the second controller 250 starts capturing images (step S5). The second controller 250 causes the image capturing section 210 to capture images at intervals set in advance to generate captured images produced through capture of images of the projection surface 10. The second controller 250 causes the second storage 260 to store the generated captured images. The interval set in advance is, for example, 16.7 milliseconds.

The second controller 250 then extracts each of the captured images from the second storage 260 in the image capturing order and performs the image analysis on the extracted captured image to detect the point position P (step S6). When the point position P cannot be detected from the captured image (NO in step S6), the second controller 250 extracts the next captured image in the image capturing order from the second storage 260 and performs the image analysis on the extracted captured image.

When the second controller 250 detects the point position P from the captured image (YES in step S6), the second controller 250 performs the image analysis on the image captured subsequent to the captured image from which point position P has been detected to determine whether any operation has been detected. The operation to be detected by the second controller 250 includes the first selection operation, the second selection operation, the first release operation, the second release operation, the first movement operation, and the second movement operation.

When the second controller 250 detects the first selection operation (YES in step S7), the second controller 250 generates the first change request (step S8).

When the second controller 250 detects that the detected point position P has stayed within the first set range around the control point S for the set period T1, and the state of the control point S located within the first set range is the initial state, the second controller 250 determines that the first selection operation has been detected. The second controller 250 generates the first change request containing the coordinates of the control point S and a request to change the state of the control point S to the ready state (step S8).

The second controller 250 transmits the generated first change request to the projector 100 (step S9). The second controller 250 causes the second storage 260 to store the coordinates of the control point S in the state changed by the first change request with the coordinates associated with the ready state, which is information representing the state of the control point S (step S10). The second controller 250 then returns to the evaluation in step S6 to detect the point position P from the captured image.

When the first selection operation has not been detected (NO in step S7) but the second selection operation has been detected (YES in step S11), the second controller 250 generates the second change request (step S12).

When the second controller 250 detects that the detected point position P has stayed within the second set range around the control point S for the set period T2, and the state of the control point S located within the second set range is the ready state, the second controller 250 determines that the second selection operation has been detected. The second controller 250 generates the second change request containing the coordinates of the control point S and a request to change the state of the control point S to the selected state (step S12).

The second controller 250 transmits the generated second change request to the projector 100 (step S13). The second controller 250 causes the second storage 260 to store the coordinates of the control point S in the state changed by the second change request with the coordinates associated with the selected state, which is information representing the state of the control point S (step S14). The second controller 250 then returns to the evaluation in step S6 to detect the point position P from the captured image.

When the second selection operation has not been detected (NO in step S11) but the first release operation has been detected (YES in step S15), the second controller 250 generates the third change request (step S16).

When the second controller 250 detects that the detected point position P has stayed within the third set range around the control point S for the period longer than or equal to the set period T1 but shorter than the set period T2, and the state of the control point S within the third set range is the ready state, the second controller 250 determines that first release operation has been detected. The second controller 250 generates the third change request containing the coordinates of the control point S and a request to change the state of the control point S to the initial state (step S16).

The second controller 250 transmits the generated third change request to the projector 100 (step S17). The second controller 250 deletes from the second storage 260 the coordinates of the control point S in the state changed by the third change request and information representing the state stored in association with the coordinates (step S18). The second controller 250 then returns to the evaluation in step S6 to detect the point position P from the captured image.

When the first release operation has not been detected (NO in step S15) but the second release operation has been detected (YES in step S19), the second controller 250 generates the fourth change request (step S20).

When the second controller 250 detects that the detected point position P stays within the third set range around the control point S for the period longer than or equal to the set period T1 but shorter than the set period T2, and the state of the control point S within the third set range is the selected state, the second controller 250 determines that second release operation has been detected. The second controller 250 generates the fourth change request containing the coordinates of the control point S and a request to change the state of the control point S from the selected state to the ready state (step S20).

The second controller 250 transmits the generated fourth change request to the projector 100 (step S21). The second controller 250 changes information representing the state of the coordinates of the control point S having the state changed by the fourth change request from the selected state to the ready state (step S22). The second controller 250 then returns to the evaluation in step S6 to detect the point position P from the captured image.

When the second release operation has not been detected (NO in step S19) but the first movement operation has been detected (YES in step S23), the second controller 250 detects the direction in which and the amount by which the point position P has been moved (step S24).

When the second controller 250 detects that the point position P has stayed within the fourth set range around the control point S for the set period T2, determines that the state of the control point S within the fourth set range is the selected state, and then detects that the point position P has been moved, the second controller 250 determines that the first movement operation has been detected. The second controller 250 detects the coordinates of the point position P before and after the movement to detect the direction in which and the amount by which the point position P has been moved (step S24).

The second controller 250 then generates the first movement request (step S25). The second controller 250 generates the first movement request containing the coordinates of all control points S in the selected state and information representing the direction and amount of the movement calculated in step S24 (step S25). The second controller 250 transmits the generated first movement request to the projector 100 (step S26). The second controller 250 then updates the coordinates of all the control points S set in the selected state based on the calculated direction and amount of movement. The second controller 250 causes the second storage 260 to store the updated coordinates of the control point S with the coordinates associated with the selected state representing the state of the control point S at the coordinates (step S27). The second controller 250 then returns to the evaluation in step S6 to detect the point position P from the captured image.

When the first movement operation has not been detected (NO in step S23) but the second movement operation has been detected (YES in step S28), the second controller 250 detects the direction in which and the amount by which the point position P has been moved (step S29).

When the second controller 250 detects that the laser light outputted by the pointing apparatus 300 has been changed from the continuous light to the light modulated at the fixed frequency by analyzing the captured images, the second controller 250 starts detecting the second movement operation. The second controller 250 detects the coordinates of the point position before and after the movement caused by the second movement operation to detect the direction in which and the amount by which the point position P has been moved (step S29).

The second controller 250 then generates the second movement request (step S30). The second controller 250 generates the second movement request containing the direction and amount of the movement calculated in step S29 (step S30). The second controller 250 transmits the generated second movement request to the projector 100 (step S31). The second controller 250 then calculates the coordinates of the control points S in the initial, ready, and selected states after the movement based on the calculated direction and amount of the movement. The second controller 250 causes the second storage 260 to store the coordinates of each of the control points S after the movement with the coordinates associated with the initial, ready, or selected state representing the state of the control point S at the coordinates (step S32). The second controller 250 then returns to the evaluation in step S6 to detect the point position P from the captured image.

The second controller 250 then evaluates whether the second controller 250 has received termination notification from the projector 100 (step S33). When the second controller 250 has not received the termination notification (NO in step S33), the second controller 250 returns to the evaluation in step S6 to detect the point position P from the captured image.

Figure 10:
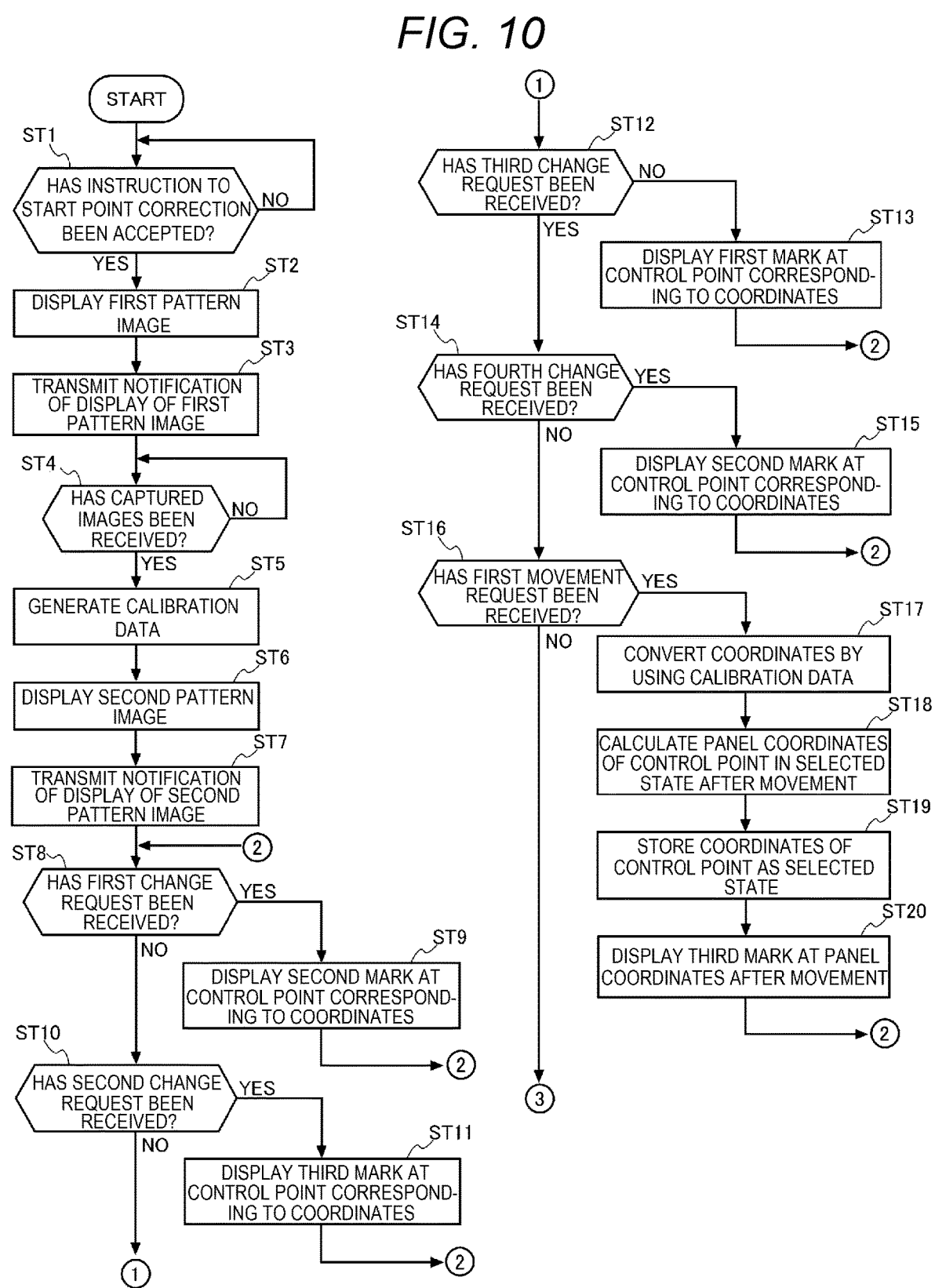
FIG. 10 is a flowchart showing the action of the projector.
Figure 11:
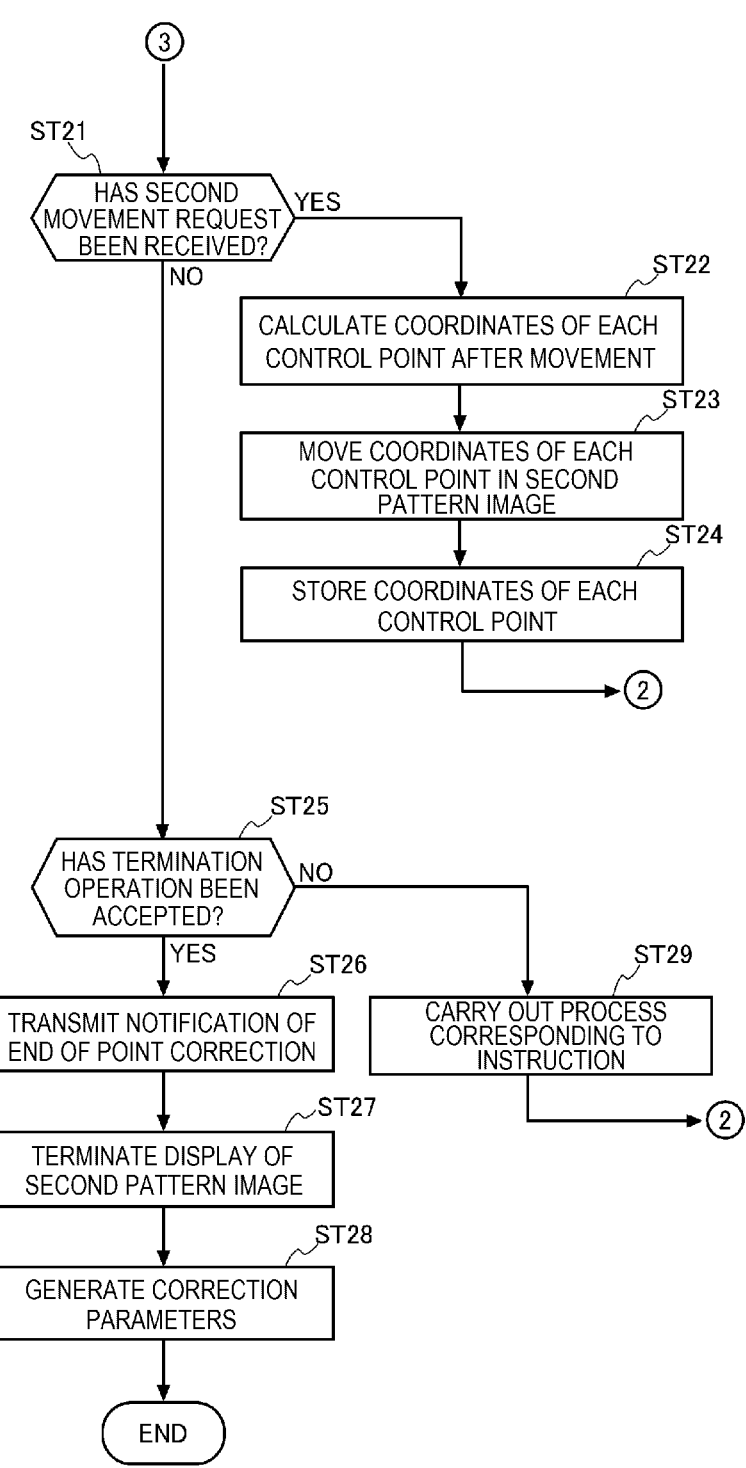
FIG. 11 is another flowchart showing the action of the projector.

FIGS. 10 and 11 are flowcharts showing the action of the projector 100.

The action of the projector 100 will be described with reference to the flowcharts shown in FIGS. 10 and 11.

First, the first controller 150 evaluates whether the first controller 150 has accepted an instruction to start the point correction (step ST1). The user inputs the instruction to start the point correction via the remote control 5. When the first controller 150 has not received the instruction to start the point correction (NO in step ST1), the first controller 150 waits until the first controller 150 receives the start instruction before starting the point correction.

When the first controller 150 receives the instruction to start the point correction (YES in step ST1), the first controller 150 generates image light corresponding to the first pattern image and projects the generated image light onto the projection surface 10. The first pattern image is thus displayed on the projection surface 10 (step ST2).

The first controller 150 then transmits notification of the display of the first pattern image to the camera 200 (step ST3) and evaluates whether the first controller 150 has received captured images from the camera 200 (step ST4). When the first controller 150 has received no captured images (NO in step ST4), the first controller 150 does not carry out the next process.

When the first controller 150 receives captured images (YES in step ST4), the first controller 150 detects the pattern of the first pattern image contained in the received captured images and generates the calibration data 163 (step ST5). The first controller 150 causes the first storage 160 to store the generated calibration data 163.

The first controller 150 then generates image light corresponding to the second pattern image 30 and projects the generated image light onto the projection surface 10. The second pattern image 30 is thus displayed on the projection surface 10 (step ST6).

The first controller 150 then transmits notification of the display of the second pattern image to the camera 200 (step ST7) and waits until the first controller 150 receives a request from the camera 200.

When the first controller 150 receives the first change request from the camera 200 (YES in step ST8), the first controller 150 converts the coordinates of the control point S indicated by coordinate information contained in the received first change request into the coordinates in the panel coordinate system by using the calibration data 163. The first controller 150 displays the second mark M2 at the converted coordinates at the liquid crystal panel 143A (step ST9). The displayed control point S selected by the first change request is thus changed from the first mark M1 to the second mark M2.

When the received request is not the first change request (NO in step ST8) but is the second change request (YES in step ST10), the first controller 150 converts the coordinates of the control point S into the coordinates in the panel coordinate system. The first controller 150 converts the coordinates of the control point S indicated by coordinate information contained in the received second change request into the coordinates in the panel coordinate system by using the calibration data 163. The first controller 150 displays the third mark M3 at the converted coordinates at the liquid crystal panel 143A (step ST11). The displayed control point S selected by the second change request is thus changed from the second mark M2 to the third mark M3.

When the received request is not the second change request (NO in step ST10) but is the third change request (YES in step ST12), the first controller 150 converts the coordinates of the control point S into the coordinates in the panel coordinate system. The first controller 150 converts the coordinates of the control point S indicated by coordinate information contained in the received third change request into the coordinates in the panel coordinate system by using the calibration data 163. The first controller 150 displays the first mark M1 at the converted coordinates at the liquid crystal panel 143A (step ST13). The displayed control point S selected by the third change request is thus changed from the second mark M2 to the first mark M1.

When the received request is not the third change request (NO in step ST12) but is the fourth change request (YES in step ST14), the first controller 150 converts the coordinates of the control point S into the coordinates in the panel coordinate system. The first controller 150 converts the coordinates of the control point S indicated by coordinate information contained in the received fourth change request into the coordinates in the panel coordinate system by using the calibration data 163. The first controller 150 displays the second mark M2 at the converted coordinates at the liquid crystal panel 143A (step ST15). The displayed control point S selected by the fourth change request is thus changed from the third mark M3 to the second mark M2.

When the received request is not the fourth change request (NO in step ST14) but is the first movement request (ST16), the first controller 150 carries out processes in accordance with the received first movement request. The first controller 150 converts the coordinates of the control point S having the selected state and contained in the first movement request into the coordinates in the panel coordinate system by using the calibration data 163 (step ST17). The first controller 150 also converts the direction and amount of the movement contained in the first movement request into the direction and amount of the movement in the panel coordinate system by using the calibration data 163 (step ST17).

The first controller 150 then calculates the panel coordinates of all control points S in the selected state after the movement based on the converted direction and amount of the movement (step ST18). The first controller 150 causes the first storage 160 to store the coordinates of the control point S in the selected state after the movement with the coordinates associated with the selected state representing the state of the control point S at the coordinates (step ST19). The first controller 150 then changes the position of the third mark M3 displayed at the control point S in the selected state from the panel coordinates before the movement to the panel coordinates after the movement (step ST20).

When the received request is not the first movement request (NO in step ST16) but is the second movement request (YES in ST21), the first controller 150 carries out processes in accordance with the received second movement request. The first controller 150 first converts the direction and amount of the movement contained in the second movement request into the direction and amount of the movement in the panel coordinate system by using the calibration data 163.

The first controller 150 then calculates the coordinates of the control points S in the second pattern image 30 after the movement based on the converted direction and amount of the movement (ST22). The first controller 150 moves the coordinates of each of the control points S in the second pattern image 30 to the calculated coordinates after the movement (step ST23) and displays any of the corresponding first mark M1, second mark M2, and third mark M3 at the coordinates after the movement. The first controller 150 then causes the first storage 160 to store the coordinates of each of the control points S in the second pattern image 30 in (step ST24).

When the second movement request has not been received (NO in step ST21), the first controller 150 evaluates whether termination operation has been accepted via the remote control 5 (step ST25).

When the termination operation has been accepted (YES in step ST25), the first controller 150 transmits notification of the end of the point correction to the camera 200 (step ST26) and terminates the display of the second pattern image on the projection surface 10 (step ST27).

The first controller 150 then generates correction parameters used in the point correction (step ST28). The first controller 150 generates the correction parameters based on the coordinates of each of the control points S in the second pattern image 30 before the movement and the coordinates of each of the control points S in the second pattern image 30 after the movement. When the first controller 150 has not accepted the second movement request, the first controller 150 acquires the coordinates of the control point S in the selected state stored in the first storage 160 as the coordinates of the control point S moved by the user's operation.

When the first controller 150 has accepted the second movement request, the first controller 150 acquires the coordinates of all the control points S from the first storage 160. The first controller 150 acquires the coordinates of all the control point S stored in the first storage 160 as the coordinates of the control points S moved by the user's operation.

When the first controller 150 has not accepted the termination operation (No in step ST25) but has accepted instruction operation other than the termination operation, the first controller 150 carries out a process corresponding to the instruction (step ST29) and returns to the process in step ST2.

6. Effects of Projection Image Correction Method

As described above, the projection image correction method according to the present embodiment is a correction method executed by the second controller 250 of the camera 200.

The second controller 250 causes the imager 210 to capture images of the projection surface 10 on which the second pattern image 30 containing a plurality of control points S is projected.

The second controller 250 performs the following actions when light which satisfies the first condition and with which the projection surface 10 is irradiated by the pointing apparatus 300 is detected in a group of a plurality of captured images produced through capture of images of the projection surface 10. That is, the second controller 250 selects at least one of the plurality of control points S as the control point S in the selected state based on the position of the light that satisfies the first condition in the group of captured images.

The second controller 250 performs the following actions when light which satisfies the second condition different from the first condition and with which the projection surface 10 is irradiated by the pointing apparatus 300 is detected in the group of captured images produced through capture of images of the projection surface 10. That is, the second controller 250 transmits to the projector 100 an instruction to change the position of the control point S in the selected state based on a change in the position of the light that satisfies the second condition and detected in the group of captured images.

The projector 100 displays on the projection surface 10 the second pattern image 30 in which the position of the control point S in the selected state has been changed.

According to the configuration described above, the control point S can be so set that it has the selected state by causing the pointing apparatus 300 to radiate the light that satisfies the first condition, and the position of the control point S set in the selected state can be moved by causing the pointing apparatus 300 to radiate the light that satisfies the second condition. The plurality of control points S can also be so set that they have the selected state, and the positions of the control points S set in the selected state can be moved by radiation of the light that satisfies the second condition. The situation in which a wrong position is selected as the position to be corrected due, for example, to the user's shaken hand is thus suppressed, and the user's intended correction is performed, whereby the convenience of the operation using the pointing apparatus 300 can be improved, as compared with a configuration in which both the operation of selecting a control point and the operation of moving the control point are performed when the light that satisfies the first condition is detected.

The camera 200 selects at least one of the plurality of control points S as the control point S in the ready state when the light that satisfies the third condition is detected in the group of captured images produced through capture of images of the projection surface 10.

The camera 200 changes the control point S in the ready state in the group of captured images to the control point S in the selected state when the light that satisfies the first condition is detected in the group of captured images produced through capture of images of the projection surface 10.

Furthermore, the control point S in the ready state is a control point located at a position that is not changed based on a change in the position of the light that satisfies the second condition.

According to the configuration described above, providing the ready state before transition to the selected state, erroneous operation via the pointing apparatus 300 can be reduced as compared with the case where the control points S are each so set that the control point S has one of the two states, the initial state and the selected state.

Each control point S in the selected state and each control point S in the ready state are displayed in different display aspects.

According to the configuration described above, each control point S in the selected state and each control point S in the ready state are displayed in different aspects, the control point S in the selected state and the control point S in the ready state are likely to be distinguished from each other, whereby the number of times of erroneous operation can be reduced.

When a control point S in the selected state is not selected from a plurality of control points S, and the light that satisfies the second condition is detected, the camera 200 changes the positions of the plurality of control points S based on a change in the position of the light that satisfies the second condition and is detected in the group of captured images.

According to the configuration described above, the positions of the plurality of control points S can be changed based on a change in the position of light that satisfies the second condition and is detected in the captured images, whereby the positions of the plurality of control points S can be moved by operating the single pointing apparatus 300.

The light that satisfies the first condition is light having a first color and radiated over the first range from any of the plurality of control points S.

The light that satisfies the second condition is light having a second color different from the first color and radiated over the second range from a control point S in the selected state.

According to the configuration described above, changing the color of the light emitted by the pointing apparatus 300 allows at least one of the plurality of control points S to be so set that the set control point S has the selected state, and the position of the control point S in the selected state to be changed.

The light that satisfies the first condition is light radiated over the first range from any of the plurality of control points S and so radiated by the pointing apparatus 300 that the light has a first light emission intensity.

The light that satisfies the second condition is light radiated over second range from a control point S in the selected state and so radiated by the pointing apparatus 300 that the light has a second light emission intensity different from the first light emission intensity.

According to the configuration described above, changing the light emission intensity of the light radiated by the pointing apparatus 300 allows at least one of the plurality of control points S to be set as a control point S in the selected state, or the position of the control point S in the selected state to be changed.

The light that satisfies the first condition is light radiated over the first range from any of the plurality of control points S and located at a position that changes within the first period by an amount smaller than a threshold.

The light that satisfies the second condition is light radiated over the second range from a control point S in the selected state, located at a position that changes within the first period by an amount smaller than the threshold, and detected in terms of movement of the position of the light after the first period elapses.

According to the configuration described above, adjusting the position, on the projection surface 10, irradiated with the light emitted by the pointing apparatus 300 allows at least one of the plurality of control points S to be so set that the set control point S has the selected state, or the position of the control point S in the selected state to be changed.

The light that satisfies the third condition is light radiated over the third range from any of the plurality of control points S and located at a position that changes within the second period by an amount smaller than the threshold.

According to the configuration described above, adjusting the position, on the projection surface 10, irradiated with the light emitted by the pointing apparatus 300 allows at least one of the plurality of control points S to be so set that the set control point S has the ready state.

7. Effects of Projection System

The projection system 1 includes the projector 100, the camera 200, the pointing apparatus 300, and the second processor 270.

The projector 100 displays a pattern image containing a plurality of control points S on the projection surface 10. The camera 200 captures images of the projection surface 10. The pointing apparatus 300 irradiates the projection surface 10 with light that satisfies conditions corresponding to the user's operation.

When the second processor 270 detects light which satisfies the first condition and with which the projection surface 10 is irradiated by the pointing apparatus 300 in a group of captured images including a plurality of captured images that are images of the projection surface 10 captured by the camera 200, the second processor 270 performs the following actions based on the position of the light that satisfies the first condition in the group of captured images. That is, the second processor 270 selects at least one of the plurality of control points S as a control point S in the selected state.

The second processor 270 further performs the following actions when the light which satisfies the second condition and with which the projection surface 10 is irradiated by the pointing apparatus 300 is detected in the group of captured images.

That is, the second processor 270 changes the position of the control point S in the selected state based on a change in the position of the light that satisfies the second condition in the group of captured images.

The projector 100 displays on the projection surface 10 the pattern image in which the position of the control point S in the selected state has been changed.

According to the configuration described above, the control point S can be so set that it has the selected state by causing the pointing apparatus 300 to radiate the light that satisfies the first condition, and the position of the control point S set in the selected state can be moved by causing the pointing apparatus 300 to radiate the light that satisfies the second condition. The plurality of control points S can thus be so set that they have the selected state, and the positions of the control points S set in the selected state can be moved by radiation of the light that satisfies the second condition. The convenience of the operation using the pointing apparatus 300 can thus be improved.

The pointing apparatus 300 includes the semiconductor laser 350 as a light source.

The semiconductor laser 350 emits light at a fixed light emission frequency.

According to the configuration described above, the light radiated by the pointing apparatus 300 is readily detected from the images captured by the camera 200.

The pointing apparatus 300 includes the second switch 303 and the input I/F circuit 310 as an operation section that accepts the operation of changing the predetermined frequency.

According to the configuration described above, the operation of the second switch 303 can change the predetermined frequency, whereby the types of operation that can be detected by the pointing apparatus 300 can be increased.

The pointing apparatus 300 includes the semiconductor laser 350 as a light source, the second switch 303 and the input I/F circuit 310 as the operation section.

During the period for which the second switch 303 keeps accepting operation, the semiconductor laser 350 repeatedly emits light and stops emitting light at the fixed frequency.

According to the configuration described above, the operation of the second switch 303 can change the predetermined frequency, whereby the types of operation that can be detected by the pointing apparatus 300 can be increased.

The embodiment described above is a preferable embodiment of the present disclosure. The present disclosure is, however, not limited to the embodiment, and a variety of variations are conceivable to the extent that the variations do not depart from the substance of the present disclosure.

For example, in the embodiment described above, the pointing apparatus 300 changes the light emission frequency at which the laser light is emitted via operation of the second switch 303, and the color or the intensity of the emitted light may be changed via operation of the second switch 303. For example, the first selection operation, the second selection operation, and the release operation described above may be performed with the light having the first color, the first movement operation may be performed with the light having the second color different from the first color, and the second movement operation may be performed with light having a third color different from the first and second colors. The light having the first color is an example of the light that satisfies the first condition, and the light having the second color is an example of the light that satisfies the second condition.

More specifically, the light having the first color is detected from a captured image, and when the position of the detected light having the first color is located within the first set range around the control point S and the state of the control point S located within the first set range is the initial state, it is determined that the first selection operation has been detected. The light having the first color is detected from a captured image, and when the position of the detected light having the first color is located within the second set range around the control point S and the state of the control point S located within the second set range is the ready state, it is determined that the second selection operation has been detected. When the first color light is detected from a captured image, it is detected that the position of the detected light having the first color stays within the third set range around the control point S for the period longer than or equal to the set period T1 but shorter than the set period T2, and it is determined that the state of the control point S within the third set range is the ready or selected state, it is determined that release operation has been detected.

When the second color light is detected from a captured image, it is determined that the position of the detected light having the second color is located in the fourth set range around the control point S and the state of the control point S within the fourth set range is the selected state, and it is then detected that the position of the light having the second color has been moved, it is determined that the first movement operation has been detected. When the light having the third color is detected from a captured image, and it is then detected that the position of the light having the third color has been moved, it is determined that the second movement operation has been detected.

To employ a configuration in which the pointing apparatus 300 can switch one of a plurality of color laser beams to another, a plurality of light sources corresponding to the plurality of colors may be incorporated, or a movable color filter may be incorporated in the optical path along which the semiconductor laser 350 emits the laser light. The movable color filter may be supported, for example, by an actuator, and the actuator may be driven to move the color filter from a position where the color filter is present in the optical path of the laser light to a position where the color filter is not present in the optical path in accordance with operation of the second switch 303.

The pointing apparatus 300 may be configured to change the intensity of the emitted light through operation of the second switch 303. For example, the first selection operation, the second selection operation, and the release operation may be performed with light having a first light emission intensity, and the first movement operation may be performed with light having a second light emission intensity different from the first light emission intensity. The second movement operation may be performed with light having a third light emission intensity different from the first light emission intensity and the second light emission intensity.

The light having the first light emission intensity is an example of the light that satisfies the first condition, and the light having the second light emission intensity is an example of the light that satisfies the second condition.

More specifically, the light having the first light emission intensity is detected from a captured image, and when the position of the detected light having the first light emission intensity is located within the first set range around the control point S and the state of the control point S located within the first set range is the initial state, it is determined that the first selection operation has been detected. The light having the first light emission intensity is detected from a captured image, and when the position of the detected light having the first light emission intensity is located within the second set range around the control point S and the state of the control point S located within the second set range is the ready state, it is determined that the second selection operation has been detected. The light having the first light emission intensity is detected from a captured image, and when it is detected that the position of the detected light having the first light emission intensity stays within the third set range around the control point S for the period longer than or equal to the set period T1 but shorter than the set period T2, and it is determined that the state of the control point S within the third set range is the ready or selected state, it is determined that release operation has been detected.

When the light having the second light emission intensity is detected from a captured image, and it is determined that the position of the detected light having the second light emission intensity is located within the fourth set range around the control point S and that the state of the control point S within the fourth set range is the selected state, and then detected that the position of the light having the second color has been moved, it is determined that the first movement operation has been detected. When the light having the third light emission intensity is detected from a captured image, and it is then detected that the position of the light having the third light emission intensity has been moved, it is determined that the second movement operation has been detected.

The pointing apparatus 300 may be configured to change the light emission frequency in accordance with the number of actions of pressing the second switch 303. For example, the pointing apparatus 300 outputs laser light at a light emission frequency of 30 Hz when the second switch 303 is pressed once, and outputs laser light at a light emission frequency of 20 Hz when the second switch 303 is pressed twice. The pointing apparatus 300 outputs laser light at a light emission frequency of 15 Hz when the second switch 303 is pressed three times, and outputs laser light at a light emission frequency of 30 Hz again when the second switch 303 is pressed four times.

To perform the first selection operation, the second selection operation, or the release operation, the user presses second switch 303 once and performs the operation with the laser light emitted at the light emission frequency of 30 Hz.

To perform the first movement operation, the user presses the second switch 303 twice and performs the operation with the laser light emitted at the light emission frequency of 20 Hz. To perform the second movement operation, the user presses the second switch 303 three times and performs the operation with the laser light emitted at the light emission frequency of 15 Hz.

The second controller 250 of the camera 200 detects the frequency of the laser light emitted by the pointing apparatus 300 based on the captured images to determine which operation has been performed.

In the embodiment described above, the second processor 270 provided in the camera 200 performs image analysis on the captured images to detect the first selection operation, the second selection operation, the release operation, the first movement operation, or the second movement operation. The process of detecting the first selection operation, the second selection operation, the release operation, the first movement operation, and the second movement operation may be performed by the first processor 170 of the projector 100 or an external control apparatus.

The functional portions of the projector 100 shown in FIG. 2, the camera 200 shown in FIG. 3, and the pointing apparatus 300 shown in FIG. 4 each represent a functional configuration achieved by cooperation between hardware and software and are each not necessarily implemented in a specific form. Therefore, hardware corresponding to each of the functional portions is not necessarily implemented, and a single processor that executes a program can, of course, achieve the functions of the plurality of functional portions. Furthermore, part of the functions achieved by software in the embodiment described above may be achieved by hardware, or part of the functions achieved by hardware in the embodiment described above may be achieved by software.

To achieve the projection image correction method described above by using a computer incorporated in the camera 200 or the projector 100, a program executed by the computer can be configured in the form of a recording medium. The program executed by the computer can instead be configured in the form of a transmission medium via which the program is transmitted. The recording medium can be a magnetic or optical recording medium or a semiconductor memory device. Specific examples of the recording medium may include a portable or immobile recording medium such as a flexible disk, an HDD, a CD-ROM (compact disc read-only memory), a DVD (digital versatile disc), a Blu-ray disc, a magneto-optical disk, a flash memory, and a card-shaped recording medium. The recording medium described above may instead be a RAM, a ROM, an HDD, or any other nonvolatile storage device that is an internal storage device provided in a server apparatus. Blu-ray is a registered trademark.

The process units in the flowchart shown in FIGS. 8 and 9 are process units into which the process carried out by the second controller 250 is divided in accordance with the primary processing content for easy understanding of the process. How to produce the divided process units or the names of the process units shown in FIGS. 8 and 9 do not limit the present disclosure. The process carried out by the second controller 250 can be further divided into a larger number of process units, and each of the process units can be further divided into a large number of processes in accordance with the content of the process. Furthermore, the order in which the processes are carried out in the flowcharts described above is not limited to that shown in FIGS. 8 and 9.

The process units in the flowcharts shown in FIGS. 10 and 11 are process units into which the process carried out by the first controller 150 is divided in accordance with the primary processing content for easy understanding of the process. How to produce the divided process units or the names of the process units shown in FIGS. 10 and 11 do not limit the present disclosure. The process carried out by the first controller 150 can be further divided into a larger number of process units, and each of the process units can be further divided into a large number of processes in accordance with the content of the process. Furthermore, the order in which the processes are carried out in the flowcharts described above is not limited to that shown in FIGS. 10 and 11.

What is claimed is:

1. A projection image correction method comprising:

capturing images of a projection surface on which a pattern image containing a plurality of control points is projected;

selecting at least one of the plurality of control points as a second control point when light that satisfies a third condition and with which the projection surface is irradiated via a pointing element in a group of captured images including a plurality of captured images produced through capture of images of the projection surface when the light which satisfies the third condition is detected in the group of captured images;

selecting the second control point as a first control point based on a position of light which satisfies a first condition and with which the projection surface is irradiated via the pointing element in the group of captured images when the light which satisfies the first condition is detected in the group of captured images;

changing a position of the first control point based on a change in a position of light which satisfies a second condition different from the first condition and with which the projection surface is irradiated via the pointing element in the group of captured images when the light which satisfies the second condition is detected in the group of captured images; and displaying the pattern image in which the position of the first control point is changed on the projection surface, wherein the second control point is a control point located at a position that is not changed based on a change in the position of the light that satisfies the second condition, and the first condition, the second condition, and the third condition are different from each other and each relates to irradiation condition of light projected from the pointing element.

2. The projection image correction method according to claim 1, wherein the first and second control points are displayed in different display aspects.

3. The projection image correction method according to claim 1, wherein when the first control point is not selected from the plurality of control points, and the light that satisfies the second condition is detected, the positions of the plurality of control points are changed based on a change in the position of the light that satisfies the second condition and is detected in the group of captured images.

4. The projection image correction method according to claim 1, wherein the light that satisfies the first condition is light having a first color and radiated over a first range from any of the plurality of control points, and the light that satisfies the second condition is light having a second color different from the first color and radiated over a second range from the first control point.

5. The projection image correction method according to claim 1, wherein the light that satisfies the first condition is light radiated over a first range from any of the plurality of control points and so radiated by the pointing element that the light has a first light emission intensity, and the light that satisfies the second condition is light radiated over a second range from the first control point and so radiated by the pointing element that the light has a second light emission intensity different from the first light emission intensity.

6. The projection image correction method according to claim 1, wherein the light that satisfies the first condition is light radiated over a first range from any of the plurality of control points and located at a position that changes within a first period by an amount smaller than a threshold, and the light that satisfies the second condition is light radiated over a second range from the first control point, located at a position that changes within the first period by an amount smaller than the threshold, and detected in terms of movement of a position of the light after the first period elapses.

7. The projection image correction method according to claim 1, wherein the light that satisfies the third condition is light radiated over a third range from any of the plurality of control points and located at a position that changes within a second period by an amount smaller than a threshold.

8. A projection system comprising:

a projector that displays a pattern image containing a plurality of control points on a projection surface;

an imaging apparatus that captures images of the projection surface;

a pointing element that irradiates the projection surface with light that satisfies a condition corresponding to a user's operation; and one or more processors, wherein the one or more processors each selects at least one of the plurality of control points as a second control point when light that satisfies a third condition and with which the projection surface is irradiated via the pointing element in a group of captured images including a plurality of captured images produced by the imaging apparatus through capture of images of the projection surface when the light which satisfies the third condition is detected in the group of captured images;

selects the second control point as a first control point based on a position of light which satisfies a first condition and with which the projection surface is irradiated via the pointing element in the group of captured images when the light which satisfies the first condition is detected in the group of captured images, changes a position of the first control point based on a change in a position of light which satisfies a second condition different from the first condition and with which the projection surface is irradiated via the pointing element in the group of captured images when the light which satisfies the second condition is detected in the group of captured images, and displays the pattern image in which the position of the first control point is changed on the projection surface, wherein the second control point is a control point located at a position that is not changed based on a change in the position of the light that satisfies the second condition, and the first condition, the second condition, and the third condition are different from each other and each relates to irradiation condition of light projected from the pointing element.

9. The projection system according to claim 8, wherein the pointing element includes a light source, and the light source emits light at a fixed light emission frequency.

10. The projection system according to claim 9, wherein the pointing element includes an operation section that accepts operation of changing the light emission frequency.

11. The projection system according to claim 9, wherein the pointing element includes a light source and an operation section, and the light source emits the light at the fixed light emission frequency during a period for which the operation section keeps accepting operation.

\* \* \* \* \*